United States Patent [19]

Pfenninger

[11] 4,147,204

[45] Apr. 3, 1979

[54] COMPRESSED-AIR STORAGE INSTALLATION

[75] Inventor: Hans Pfenninger, Baden, Switzerland

[73] Assignee: BBC Brown, Boveri & Company Limited, Baden, Switzerland

[21] Appl. No.: 852,488

[22] Filed: Nov. 17, 1977

[30] Foreign Application Priority Data

Dec. 23, 1976 [CH] Switzerland .................. 16244/76

[51] Int. Cl.² .................. F23L 15/02; B65G 5/00
[52] U.S. Cl. .................. 165/4; 165/45; 60/398; 60/408; 60/659; 405/53; 290/43
[58] Field of Search .............. 165/4, 45, 104 F, 104 S, 165/DIG. 4; 61/0.5; 60/398, 407, 408, 412, 413, 641, 659; 290/43, 54; 405/53

[56] References Cited

U.S. PATENT DOCUMENTS

| 3,523,192 | 8/1970 | Lang | 290/43 X |
| 3,796,044 | 3/1974 | Schwarz | 61/0.5 X |
| 3,988,897 | 11/1976 | Strub | 60/398 X |

Primary Examiner—Edgar W. Geoghegan
Attorney, Agent, or Firm—Werner W. Kleeman

[57] ABSTRACT

A compressed-air storage installation comprising a heat accumulator for storing heat contained in compressed air and the air is passed into subterranean caverns. The heat accumulator has partitions therein which are provided between a storage medium. The partitions form a number of air passages through which the hot compressed air entering at the central region of the heat accumulator flows in an essentially outward direction, thereby cools and flows on into the cavern.

10 Claims, 1 Drawing Figure

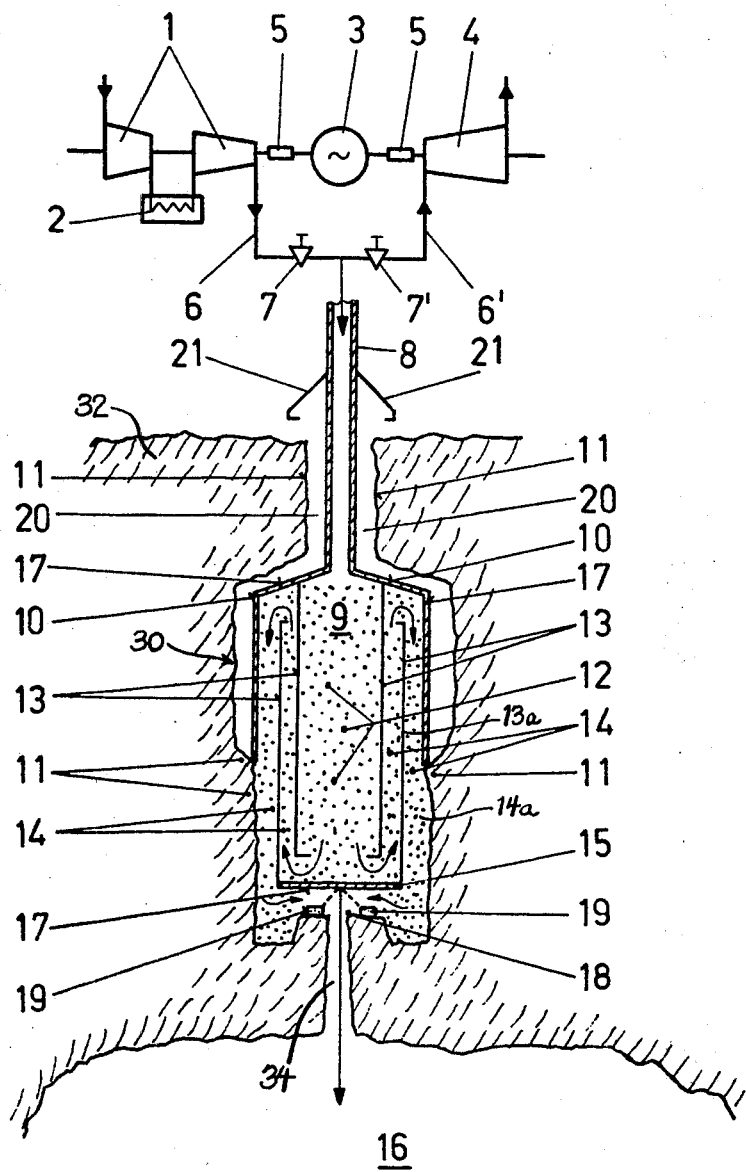

4,147,204

COMPRESSED-AIR STORAGE INSTALLATION

BACKGROUND OF THE INVENTION

The present invention relates to a new and improved construction of a compressed-air storage installation having a heat accumulator for storing heat contained in compressed air, with the compressed air being passed into subterranean caverns.

It is already known to employ compressed air instead of liquids as a storage medium for storing energy. The state-of-the-art compressed-air storage installations store compressed air at times of low load and utilize it at times of peak load to generate additional peak load energy.

With these known installations, in order to increase the stored energy while the air is expanding, the air is heated by combustion of liquid or gaseous fuels before entering an expansion turbine.

Compared with hydraulic pump storage stations, this technique has the disadvantage that additional energy in the form of a fuel is required for the storage of energy.

It has also been proposed not cooling the air during the compression process, in order to thereby obtain as high as possible compressor discharge temperature, and that the compressed air then should be passed into a heat accumulator which removes heat from the air. After the heat is removed, the cold air then can be stored in a compressed-air store. Before the air expands in the gas turbine it is heated in the same heat accumulator in the reverse flow direction.

Since the air usually has a pressure of 30 to 60 bar in these known installations, the outlay for storage above ground is too great and too expensive. It is for this reason that there are presently used subterranean caverns for storing air. Upon leaving the compressor the air which is to be stored has a temperature of about 300° C to 500° C. The rock strata forming the cavern will not withstand such temperatures, and even a lining of rock of relatively high heat resistance would be costly to maintain, especially since additional temperature fluctuations occur in the heat accumulator during such time as the storage cavern is being charged and discharged.

SUMMARY OF THE INVENTION

Therefore, with the foregoing in mind it is a primary object of the present invention to provide an improved compressed-air storage installation which is not associated with the aforementioned drawbacks and limitations of the prior art proposals.

Another and more specific object of the present invention aims at creating a compressed-air storage installation with heat accumulator which is operated without additional fuel and which is simple and cheap to construct and arranged such that no high temperatures and temperature fluctuations occur in the rock wall.

Now in order to implement these and still further objects of the invention, which will become more readily apparent as the description proceeds, the compressed-air storage installation of the present development is manifested by the features that partitions are provided within the heat accumulator between a storage medium, in particular stones. These partitions or partition members form a number of air passages through which the hot compressed air entering at the center or central region of the heat accumulator flows in an essentially outward direction, thereby cools and flows on into the cavern.

One important advantage of the present invention resides in the fact that the partition walls or paritions between the storage medium, in particular between stones, are so arranged that the incoming air is forced to flow through the storage medium in an outward direction and gives up its heat to the medium.

According to another advantageous construction of the invention, the air passages are arranged in such a manner that a rock wall serves as the outer bounding surface of the last passage.

The consequence of this arrangement is that the air flowing around the partition walls or partitions has given up the heat contained in it to the storage medium by the time it reaches the rock wall, and hence the rock wall remains relatively cool, i.e., attains a maximum temperature of 40° C. to 80° C. Due to these measures, there is avoided crumbling of the rock wall due to the thermal effects, and thus, there is ensured that the underground chamber of the heat accumulator retains its freedom from leaks, in other words remains leak-tight.

Furthermore, it is advantageous if the partition walls are formed of sheet metal and are thermally insulated at places having large temperature gradients or differences between the individual air passages.

It has proved to be of special benefit if the aforementioned partition walls are provided with thermal insulation at places with large temperature differences, in particular at the hot air inlet into the heat accumulator and also opposite the outlet from the heat accumulator to the cavern.

According to another construction of the invention there are provided artificially calcined and hardened stones as the storage medium.

Through the use of artificially calcined and hardened stones as a storage medium it is possible to fill the interior of the heat accumulator with uniform interstices allowing the passage of air, because the artificially calcined and hardened stones can be shaped according to requirements.

It has been found to be especially beneficial if in the heat accumulator of the invention the minimum ratio of the accumulator length to the accumulator diameter is about 2:1.

It is furthermore advantageous if there is provided between an air inlet pipe and the rock wall surrounding the same a gap in which, by means of natural air circulation, the heat passing through the thermal insulation can be removed to the outside.

This avoids heating of the rock outside the central, hot air inlet pipe, and the occurrence of thermal stresses in the rock.

BRIEF DESCRIPTION OF THE DRAWING

The invention will be better understood and objects other than those set forth above will become apparent when consideration is given to the following detailed description thereof. Such description makes reference to the annexed drawing wherein the single FIGURE schematically illustrates, partially in sectional view, a compressed-air storage installation constructed according to the teachings of the present invention.

DETAILED DESCRIPTION OF THE PREFERRED EMBODIMENTS

Describing now the drawing, an exemplary embodiment of the invention is shown schematically and partially in sectional view in the single FIGURE, wherein reference character 1 denotes two compressors between which there can be located a cooler 2. Between the compressors 1 and one side of a motor-generator 3 and the other side of the motor-generator 3 and a gas turbine 4 there are provided couplings 5 by means of which the gas turbine 4 can be selectively coupled with the motor-generator 3 or the motor-generator 3 can be coupled with the compressors 1, as required. Between the gas turbine 4 and the compressors 1, there are pipes or conduits 6 and 6' which incorporate shutoff elements in the form of stop valves 7 and 7', respectively. The pipes 6 and 6' are joined to an insulated pipe or conduit 8 which leads into a subterranean heat accumulator 9.

Now the subterranean heat accumulator 9 is preferably of such a form that it consists of a cavern, generally indicated by reference character 30, cut out of the naturally occurring rock 32. The insulated pipe or conduit 8 carries heated air coming from the compressors 1 to the center or central region of the heat accumulator 9. The heat accumulator 9 is covered at the top by a cover 10 connected in any appropriate manner with the insulated pipe 8. It is advantageous if the cover 10 is extended further downwards until it encounters a rock wall 11 to which it is anchored, forming a seal in the upward direction.

Inside of the subterranean heat accumulator 9 there is a storage medium 12, preferably stones or artificially calcined and hardened stones, between which there are arranged the partition walls or partitions 13. Between the spaced partition walls 13 there are formed air passages 14 through which the hot air flows in a generally outward direction, in other words in the direction of the indicated arrows. The air passages 14 are provided in such a manner that the last passage, here indicated by reference character 14a, is formed between one of the partition walls 13 and the rock wall 11. At places with particularly large temperature differences, for example at the air inlet, i.e., the region where the air travelling through the insulated pipe 8 enters the heat accumulator 9, and at a baffle device 15 closing off the cavern 30 of the heat accumulator 9 from a compressed-air storage cavern 16, the partition walls 13, the cover or cover member 10 and the baffle device 15 are provided with thermal insulation 17. Located at an air outlet 18 from the heat accumulator 9 into the compressed-air storage cavern 16 are heat-loss coolers 19 which absorb any heat losses still present before the inlet 34 into the compressed-air storage cavern 16.

Between the insulated pipe 8 carrying air into the heat accumulator 9, and also the cover 10 and the rock wall 11 surrounding the cover 10 and the insulated pipe 8, there is provided a gap or intermediate space 20 where the heat passing through the thermal insulation 17 can be removed to the outside by natural air circulation. Furthermore, a protective cover 21 is located on the insulated pipe 8 and this protective cover 21 prevents rain or snow from entering the gap or intermediate space 20 and hence passing into the heat accumulator 9.

The compressed-air storage installation with heat accumulator as contemplated by the present invention functions in the following manner:

At times of low load demand, the motor-generator 3 is coupled by way of coupling 5 to the compressors 1 and drives the latter. At the same time, coupling 5 between the motor-generator 3 and the gas turbine 4 is disengaged, and the stop valve 7' in the pipe 6' is closed, and the stop valve 7 in the pipe 6 is open. The air which has been compressed and heated in the compressors 1 passes along the pipe 6 and the open stop valve 7 and through the insulated pipe 8 into the center or central region of the storage medium 12 contained in the subterranean heat accumulator 9. This air is forced between the partition walls or partitions 13 into the air passages 14 and thus flows in a generally outward direction, while giving-up the heat contained in it to the storage medium 12. In the last air passage 14a such air flows downwards between the rock wall 11 and the last partition wall 13a, flows through the heat-loss coolers 19, where it surrenders any remaining heat, and passes through the air outlet 18 and passage 34 into the compressed-air storage cavern 16.

At times of peak load with additional demand for energy, the air stored in the subterranean cavern 16 passes upward through the heat accumulator 8, whereupon it must again flow through the air passages 14, but in the opposite direction. In doing so it absorbs heat which has been stored in the storage medium 12 and is led through the insulated pipe 8 and the now open stop valve 7' in the pipe 6' to the gas turbine 4 which now is coupled to the motor-generator 3 by way of the related coupling 5.

The compressed-air storage installation with heat accumulator as described above is not restricted to what has been shown in the drawing. For example, there can be provided a pipe system filled with liquid instead of a solid storage medium 12, which may consist of natural stones or of artificially calcined and hardened stones, and so forth. Furthermore, not particularly illustrated non-return valves could be arranged at the heat-loss coolers 19 so that the compressed air flowing into the cavern 16 is passed through the residual heat coolers 19, whereas when the flow is reversed the compressed air from the cavern 16 by-passes the residual heat coolers 19. Non-return valves of this kind would reduce a relatively large drop in pressure of the compressed air.

While there are shown and described present preferred embodiments of the invention, it is to be distinctly understood that the invention is not limited thereto, but may be otherwise variously embodied and practiced within the scope of the following claims. Accordingly,

What I claim is:

1. A compressed-air storage installation comprising:
a heat accumulator for storing heat contained in compressed air moving through said heat accumulator;
at least one subterranean cavern into which there is passed the air moving through the heat accumulator;
a storage medium disposed within said heat accumulator for the storage of the heat of the compressed air moving through the heat accumulator;
partition means arranged in the storage medium for forming a number of air passages through which hot compressed air flows in an essentially outward direction;
means for infeeding the hot compressed air to the heat accumulator;
said hot compressed air which flows in an essentially outward direction through said air passages cooling due to heat transfer to the storage medium and then flowing on into said subterranean cavern.

2. The compressed-air storage installation as defined in claim 1, wherein:
said storage medium comprises stones.

3. The compressed-air storage installation as defined in claim 1, wherein:
said partition means comprises partition walls forming a number of said air passages.

4. The compressed-air storage installation as defined in claim 1, wherein:
the partition means forming the air passages are arranged in a manner such that a rock wall of the cavern serves as an outer bounding surface of the outermost passage of said air passages.

5. The compressed-air storage installation as defined in claim 1, wherein:
said partition means comprise partition walls formed of sheet metal.

6. The compressed-air installation as defined in claim 5, wherein:
said partition walls are provided with thermal insulation means at places possessing large temperature differences between the individual air passages.

7. The compressed-air installation as defined in claim 1, wherein:
said storage medium comprises artificially calcined and hardened stones.

8. The compressed-air storage installation as defined in claim 1, wherein:
said heat accumulator has a minimum ratio of its length to its diameter which amounts to about 2:1.

9. The compressed-air storage installation as defined in claim 7, wherein:
said means for infeeding the hot compressed air comprises an air inlet pipe at least partially surrounded by a rock wall;
said air inlet pipe being dispositioned in relation to the rock wall surrounding it such that there is provided a gap by means of which through natural air circulation the heat passing through the thermal insulation means can be removed to the outside.

10. The compressed-air storage installation as defined in claim 1, wherein:
said heat accumulator is provided with air outlet means; and
heat-loss cooler means located at the region of said air outlet means.

* * * * *